United States Patent
An et al.

(10) Patent No.: US 11,904,786 B2
(45) Date of Patent: Feb. 20, 2024

(54) INTERIOR MATERIAL FOR VEHICLE AND METHOD FOR MOLDING INTERIOR MATERIAL FOR VEHICLE

(71) Applicants: HYUNDAI MOTOR COMPANY, Seoul (KR); KIA CORPORATION, Seoul (KR); KBI Dongkook Ind. Co., Ltd., Seoul (KR)

(72) Inventors: Jae Hyun An, Seosan-si (KR); In Soo Han, Uiwang-si (KR); Woo Hyun Lim, Suwon-si (KR); Kyu Ha Yoo, Gunpo-si (KR); Dong Il Son, Ulsan (KR); Dong Hyuk Choi, Ulsan (KR); Chang Woo Kang, Ulsan (KR); Chang Bok Park, Ulsan (KR); Wan Gyu Choi, Ulsan (KR)

(73) Assignees: Hyundai Motor Company, Seoul (KR); Kia Corporation, Seoul (KR); KBI DONGKOOK IND. CO., LTD., Seoul (KR)

( * ) Notice: Subject to any disclaimer, the term of this patent is extended or adjusted under 35 U.S.C. 154(b) by 7 days.

(21) Appl. No.: 17/560,932

(22) Filed: Dec. 23, 2021

(65) Prior Publication Data
US 2022/0203919 A1    Jun. 30, 2022

(30) Foreign Application Priority Data
Dec. 24, 2020    (KR) .......................... 10-2020-0183404

(51) Int. Cl.
*B29C 51/14*    (2006.01)
*B29C 51/42*    (2006.01)
(Continued)

(52) U.S. Cl.
CPC .............. *B60R 21/04* (2013.01); *B29C 51/14* (2013.01); *B29C 51/422* (2013.01);
(Continued)

(58) Field of Classification Search
CPC ..... B29C 43/021; B29C 43/04; B29C 43/146; B29C 43/36; B29C 43/56;
(Continued)

(56) References Cited

U.S. PATENT DOCUMENTS 5,456,976 A * 10/1995 LaMarca, II .......... B32B 27/065
428/317.1
6,136,415 A * 10/2000 Spengler ............... B29C 44/569
428/318.6
(Continued)

FOREIGN PATENT DOCUMENTS

EP           3492322 B1    3/2021
KR    10-2001-0073709 A    8/2001
(Continued)

*Primary Examiner* — Michael A Tolin
(74) *Attorney, Agent, or Firm* — Morgan, Lewis & Bockius LLP

(57) ABSTRACT

The present disclosure relates to an interior material for a vehicle and a method for molding the interior material for the vehicle, and more specifically the method for molding an interior material for a vehicle according to the present disclosure includes heating a skin inserted into an upper end heater and a lower end heater spaced apart from each other; preforming the heated skin using an upper mold having a mold temperature set to have a set shape and a lower mold having a second mold temperature; and pressing the preformed skin and a core using a 1-1 mold and a 1-2 mold having set mold temperatures.

5 Claims, 4 Drawing Sheets

(51) Int. Cl.
*B29L 31/30* (2006.01)
*B32B 27/08* (2006.01)
*B32B 27/32* (2006.01)
*B32B 27/40* (2006.01)
*B60R 21/04* (2006.01)
*B32B 27/06* (2006.01)
*B29K 105/04* (2006.01)

(52) U.S. Cl.
CPC ............ *B32B 27/065* (2013.01); *B32B 27/08* (2013.01); *B32B 27/32* (2013.01); *B32B 27/40* (2013.01); *B29K 2105/04* (2013.01); *B29L 2031/3005* (2013.01); *B32B 2250/04* (2013.01); *B32B 2250/24* (2013.01); *B32B 2266/025* (2013.01); *B32B 2266/0278* (2013.01); *B32B 2307/546* (2013.01); *B32B 2605/003* (2013.01)

(58) Field of Classification Search
CPC ............ B29C 2043/3602; B29C 51/08; B29C 51/082; B29C 51/10; B29C 51/14; B29C 51/18; B29C 51/26; B29C 51/261; B29C 51/262; B29C 51/266; B29C 51/267; B29C 51/42; B29C 51/421; B29C 51/422; B29C 51/423; B29C 51/425; B29C 51/428; B29C 59/022; B29C 65/48; B29C 70/48; B29K 2075/00; B29K 2101/10; B29K 2101/12; B29K 2105/04; B29L 2031/3005; B29L 2031/3008; B29L 2031/3014; B29L 2031/3041; B29L 2031/3055; B32B 5/18; B32B 7/022; B32B 7/12; B32B 27/06; B32B 27/065; B32B 27/08; B32B 27/32; B32B 27/40; B32B 33/00; B32B 37/06; B32B 37/10; B32B 38/00; B32B 38/1866; B32B 2038/008; B32B 2050/04; B32B 2050/24; B32B 2055/10; B32B 2266/025; B32B 2266/0278; B32B 2274/00; B32B 2307/546; B32B 2605/003; B60R 13/02; B60R 13/0237; B60R 13/0243; B60R 13/0256; B60R 13/0262; B60R 21/04
See application file for complete search history.

(56) References Cited

U.S. PATENT DOCUMENTS 7,101,503 B2 * 9/2006 Spengler .................. B30B 7/02
264/250
9,931,783 B2 * 4/2018 Sotokawauchi ...... B29C 51/421

FOREIGN PATENT DOCUMENTS

| KR | 10-1773138 B1 | 8/2017 |
| KR | 10-2216633 B1 | 2/2021 |
| KR | 10-2021-0039689 A | 4/2021 |
| WO | 2019/202098 A1 | 10/2019 |

* cited by examiner

INTERIOR MATERIAL FOR VEHICLE AND METHOD FOR MOLDING INTERIOR MATERIAL FOR VEHICLE

CROSS-REFERENCE TO RELATED APPLICATION

This application claims under 35 U.S.C. § 119(a) the benefit of priority to Korean Patent Application No. 10-2020-0183404 filed on Dec. 24, 2020, the entire contents of which are incorporated herein by reference.

TECHNICAL FIELD

The present disclosure relates to an interior material for a vehicle and a method for molding the interior material for the vehicle, and more specifically, to a method for molding an interior material for a vehicle by pressing a resin molded material, and the interior material for the vehicle molded thereby.

BACKGROUND

In general, for an interior material for a vehicle, a skin used as an interior material is manufactured by using a raw material made of an olefin-based thermoplastic elastomer (TPO) and a thermo plastic polyurethane (TPU) used as a type of a PVC or a thermoplastic elastomer (TPE).

In other words, a product such as the interior material for the vehicle tends to be manufactured as a foam product having a triple structure of a skin layer, a polyurethane foam layer, and a core layer by foaming and molding a foam solution, such as polyurethane, between a hard core made of a plastic material and a soft skin made of a leather or fabric material that gives a high-quality and soft image.

Meanwhile, in recent years, there are many methods for manufacturing an instrument panel for implementing the texture of a leather with a plastic to reduce a manufacturing cost, and it is easy to manufacture the instrument panel because a mold is used in manufacturing.

In addition, for this interior material for the vehicle (particularly, a product to which a real stitch is applied), the interior material for the vehicle is generally manufactured in a process of pressing a skin on which a stitch is formed and a core, but due to a shape of the skin and a shape of the core, the skin is not completely in close contact with the core or is excessively in close contact therewith in some sections, thereby causing the thickness deviation or causing the defects of the product due to the positional difference between the skin and the core.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

An object of the present disclosure is to propose a method for pressing a skin on which a stitch is formed to a core.

Another object of the present disclosure is to propose a method to reduce a defect rate.

Still another object of the present disclosure is to propose a skin with an excellent tactility.

Yet another object of the present disclosure is to propose a method for enhancing a pressing strength of the skin and the core.

Still yet another object of the present disclosure is to propose a method for improving the degree of freedom of a skin.

To this end, an interior material for a vehicle is composed of a skin including a first skin layer made of a thermosetting resin, a second skin layer bonded to a lower end of the first skin layer and made of a thermoplastic resin, and a third skin layer bonded to a lower end of the second skin layer and made of the thermoplastic resin, and a core bonded to the skin and made of a resin.

To this end, a method for molding an interior material for a vehicle according to the present disclosure includes heating a skin inserted into an upper end heater and a lower end heater spaced apart from each other; preforming the heated skin using an upper mold having a mold temperature set to have a set shape and a lower mold having a second mold temperature; and pressing the preformed skin and a core using a 1-1 mold and a 1-2 mold having set mold temperatures.

To this end, a method for molding an interior material for a vehicle includes heating a skin inserted into an upper end heater and a lower end heater spaced apart from each other and pressing the heated skin and a core using a 2-1 mold and a 2-2 mold having set mold temperatures.

According to the interior material for the vehicle and the method for molding the interior material for the vehicle, it is possible to manufacture the interior material for the vehicle with the excellent tactility and moldability using the skin composed of the first skin layer, the second skin layer, and the third skin layer.

In particular, according to the present disclosure, it is possible to appropriately set the mold temperature of the mold in consideration of the characteristics of the skin and the core during the preforming process of the skin or the pressing process of the core and the skin, thereby improving the pressing strength of the core and the skin.

The molding mold for molding the interior material for the vehicle according to the present disclosure can constitute the supporter for supporting at least a part of the rim of the skin between the upper mold and the lower mold, and therefore, the core mounted on the upper mold can be completely in close contact with and pressed on the skin. In other words, the necessary portion of the rim of the skin supported by the supporter can be supported by the supporter, thereby increasing the degree of freedom of the skin, and the skin with the high degree of freedom can be pressed in the state of being completely in close contact with the falling core.

In addition, it is possible to vibrate the supporter if necessary, thereby improving the degree of freedom of the skin, and therefore, the skin and the core can be pressed in the state of being more in close contact with each other.

It is understood that the term "automotive" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid automotive is an automotive that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
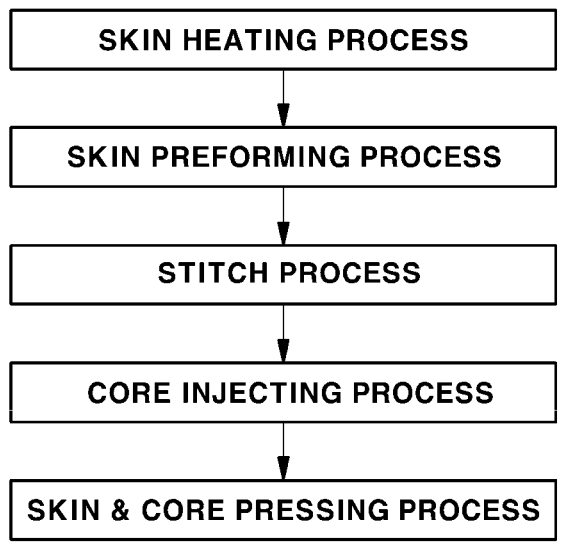
FIG. 1 shows a process of manufacturing an interior material for a vehicle according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

The foregoing, and additional aspects of the present disclosure will become more apparent through preferred exemplary embodiments described with reference to the accompanying drawings. Hereinafter, these exemplary embodiments of the present disclosure will be described in detail so that they can be easily understood and reproduced by those skilled in the art.

FIG. 1 shows a process of manufacturing an interior material for a vehicle according to an exemplary embodiment of the present disclosure. Hereinafter, a manufacturing process of manufacturing an interior material for a vehicle according to an exemplary embodiment of the present disclosure will be described in detail with reference to FIG. 1.

Referring to FIG. 1, the manufacturing process of manufacturing the interior material for the vehicle is performed in the order of a skin heating process, a skin preforming process, a stitch process, a core injecting process, and a skin & core pressing process. Of course, other processes other than the aforementioned processes can be included in the manufacturing process of manufacturing the interior material for the vehicle.

The skin heating process is a process of heating a skin for preforming. The skin proposed by the present disclosure is composed of at least two resin layers. A configuration of the resin will be described later.

The skin preforming process molds the skin in a desired form using a 1-1 mold and a 1-2 mold. The 1-1 mold and the 1-2 mold according to the present disclosure maintain a set temperatures as a mold temperature for easy pressing and molding.

The stitch process forms a stitch on the skin for which the preforming process was performed.

The core injecting process is a process of injecting a core to be pressed with the skin on which the stitch is formed.

The skin & core pressing process is a process of pressing the skin and the core using a 2-1 mold and a 2-2 mold. In other words, the skin & core pressing process presses the skin and the core by closing the 2-1 mold and the 2-2 mold in a state of supporting the skin and the core between the 2-1 mold and the 2-2 mold.

As described above, the present disclosure manufactures the interior material for the vehicle by pressing the skin and the core. Hereinafter, a technology for each process will be described in detail.

The skin proposed by the present disclosure is composed of a first skin layer, a second skin layer, and a third skin layer. The first skin layer is made of a thermosetting resin, and preferably has a tactility similar to a tactility of artificial leather because it is relatively located on the uppermost end. To this end, a tactility coefficient (coefficient of static friction—coefficient of motion friction) of the first skin layer is preferably iii and the thickness thereof is preferably 0.1±0.05 mm.

The second skin layer is made of a thermoplastic resin, and located between the first skin layer and the second skin layer. The second skin layer preferably has moldability and soft feel, and therefore, a soft coefficient (coefficient of static friction) is preferably 0.4±0.02. In addition, the thickness of the second skin layer is preferably 0.1 to 0.55 mm.

The third skin layer is relatively located on the lowermost end, and is preferably made of a material with moldability and cushion feel. The third skin layer proposed by the present disclosure is made of the thermoplastic resin, and the thickness thereof is preferably formed at 3±1.0 mm.

In other words, it is preferable that the thickness of the third skin layer made of the thermoplastic resin is relatively the largest, and the thickness of the first skin layer made of the thermosetting resin is relatively the smallest.

Figure 2:
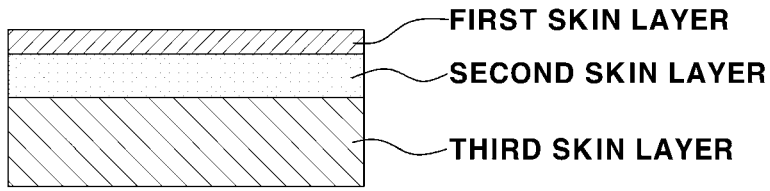
FIG. 2 shows a structure of a skin according to the exemplary embodiment of the present disclosure.

FIG. 2 shows a structure of a skin according to the exemplary embodiment of the present disclosure. As shown in FIG. 2, the skin is composed of three skin layers, and as described above, the thickness of the third skin layer located on the lowermost end is relatively the largest.

In particular, as proposed by the present disclosure, the first skin layer can be made of a polyurethane (PU), the second skin layer can be made of a thermoplastic polyurethane (TPU), and the third skin layer can be made of a polypropylene (PP) foam. In addition, as described above, the first skin layer is made of the thermosetting resin unlike the second skin layer and the third skin layer. The first skin layer and the third skin layer are related to tactility, and the second skin layer is related to moldability.

Figure 3:
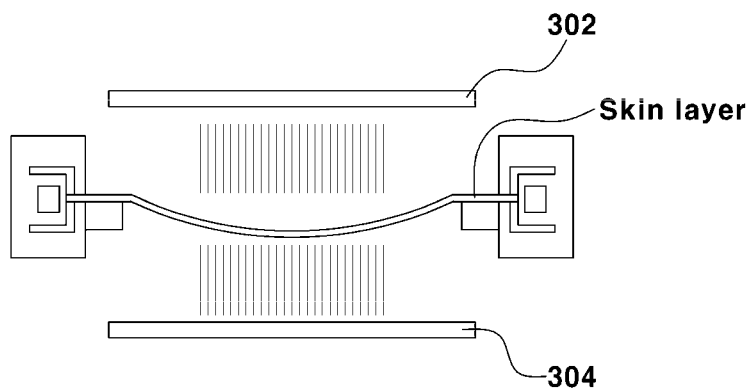
FIG. 3 shows a skin heating process according to the exemplary embodiment of the present disclosure.

FIG. 3 shows a skin heating process according to the exemplary embodiment of the present disclosure. Hereinafter, the skin heating process will be described with reference to FIG. 3.

The skin heating process constitutes an upper end heater 302 and a lower end heater 304 to be spaced apart from each other at a certain interval, and heats the constituted upper end heater 302 and lower end heater 304 in a state of inserting the skin into the constituted upper end heater 302 and lower end heater 304. According to the present disclosure, the first skin layer is made of the thermosetting resin, and the second and third skin layers are made of the thermoplastic resin. Therefore, a temperature of the upper end heater 302 relatively close to the first skin layer and a temperature of the lower end heater 304 relatively close to the third skin layer are different. In other words, the temperature of the lower end heater 304 is set relatively higher than the temperature of the upper end heater 302. For example, the temperature of the upper end heater 302 can be set as 140° whereas the temperature of the lower end heater 304 can be set as 160°. In addition, the temperatures of the upper end heater 302 and the lower end heater 304 can be set differently, but even in this case, the temperature of the upper end heater 302 is preferably set relatively lower than the temperature of the lower end heater 304.

In addition, the temperature of the heater can be controlled in various forms. For example, only the lower end heater can be heated at a set temperature in a state where the upper end heater is not heated in consideration of the physical property of the first skin layer. In this case, the heating is preferably conducted so that a surface temperature of the skin rather than a heating temperature of the heater becomes the set temperature. Therefore, when the surface temperature of the skin reaches the set temperature, the skin heating by the heater is interrupted.

The skin heated by the upper end heater 302 and the lower end heater 304 is subjected to the skin performing process later. Hereinafter, the skin preforming process will be described.

Figure 4:
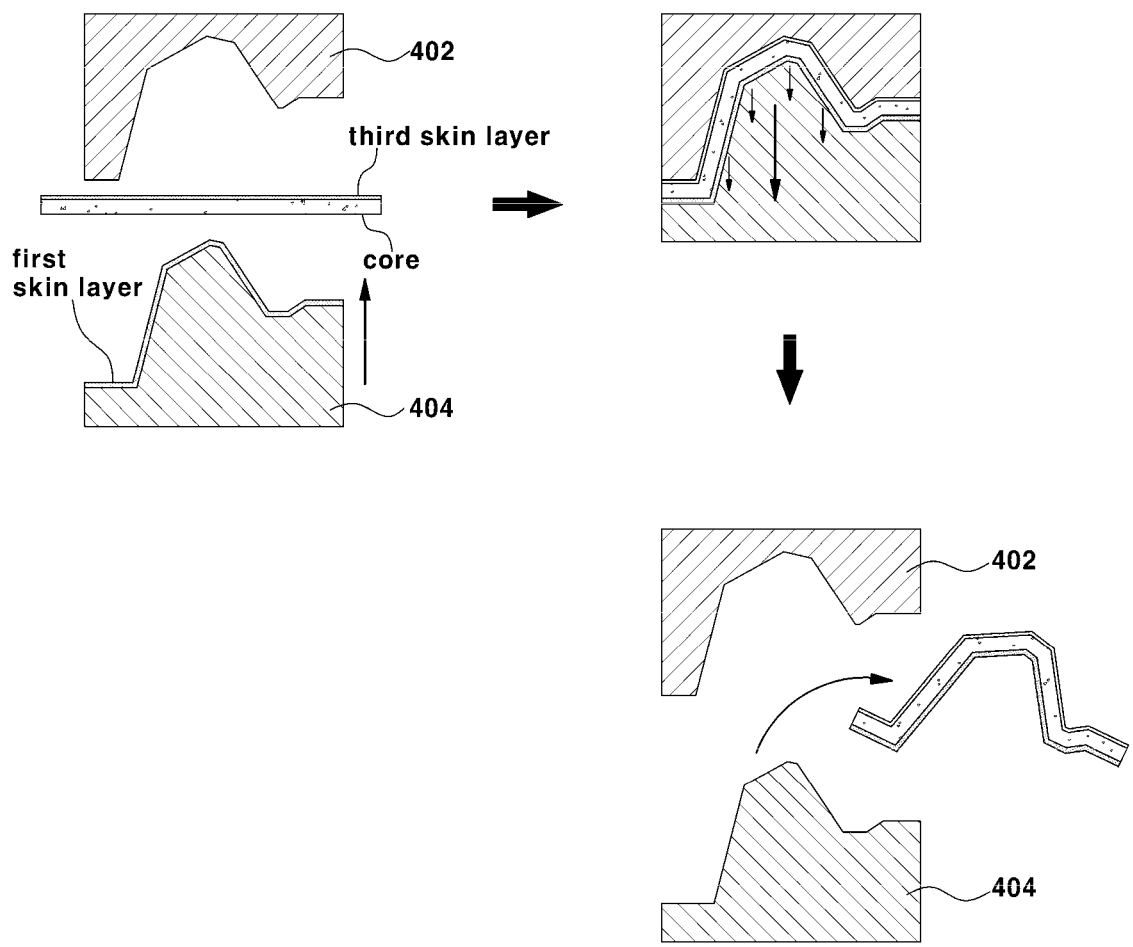
FIG. 4 shows a skin preforming process according to the exemplary embodiment of the present disclosure.

FIG. 4 shows a skin preforming process according to the exemplary embodiment of the present disclosure. Hereinafter, the skin preforming process according to the exemplary embodiment of the present disclosure will be described with reference to FIG. 4.

The skin preforming process closes an upper mold 402 and a lower mold 404 in a state of supporting the heated skin between the upper mold 402 and the lower mold 404. According to the present disclosure, the lower mold 404 in close contact with the first skin layer and the upper mold 402 in close contact with the third skin layer have set temperatures. According to the present disclosure, the upper mold 402 in close contact with the third skin layer has the mold temperature of 25° to 30°, and the lower mold 404 in close contact with the first skin layer has the mold temperature of 60° to 70°. The upper mold 402 and the lower mold 404 maintain the closed state for 50 seconds to 150 seconds.

The reason why the temperature of the lower mold in close contact with the first skin layer is set to have the temperature of 60° to 70° is to maintain the basic physical property of the first skin layer. In other words, when a very high heat is applied to the first skin layer, the basic physical property of the first skin layer, such as tactility or soft feel, is changed. Therefore, the temperature of the lower mold is preferably maintained at the temperature of 60° to 70° at which the basic physical property of the first skin layer is not changed.

In the skin heating process, the temperature of the upper end heater close to the first skin layer is set relatively lower than the temperature of the lower end heater close to the third skin layer, whereas in the skin preforming process, the mold temperature of the upper mold close to the first skin layer is set higher than the mold temperature of the lower mold close to the third skin layer. However, in the preforming process, the mold temperature at which the first skin layer is not hardened by the upper mold and the lower mold is maintained.

As described above, the present disclosure performs the process of pressing the skin performed by the skin preforming process to the core.

As described above, the preformed skin and the core are subjected to the pressing process using the upper mold and the lower mold, thereby manufacturing the interior material for the vehicle.

Figure 5:
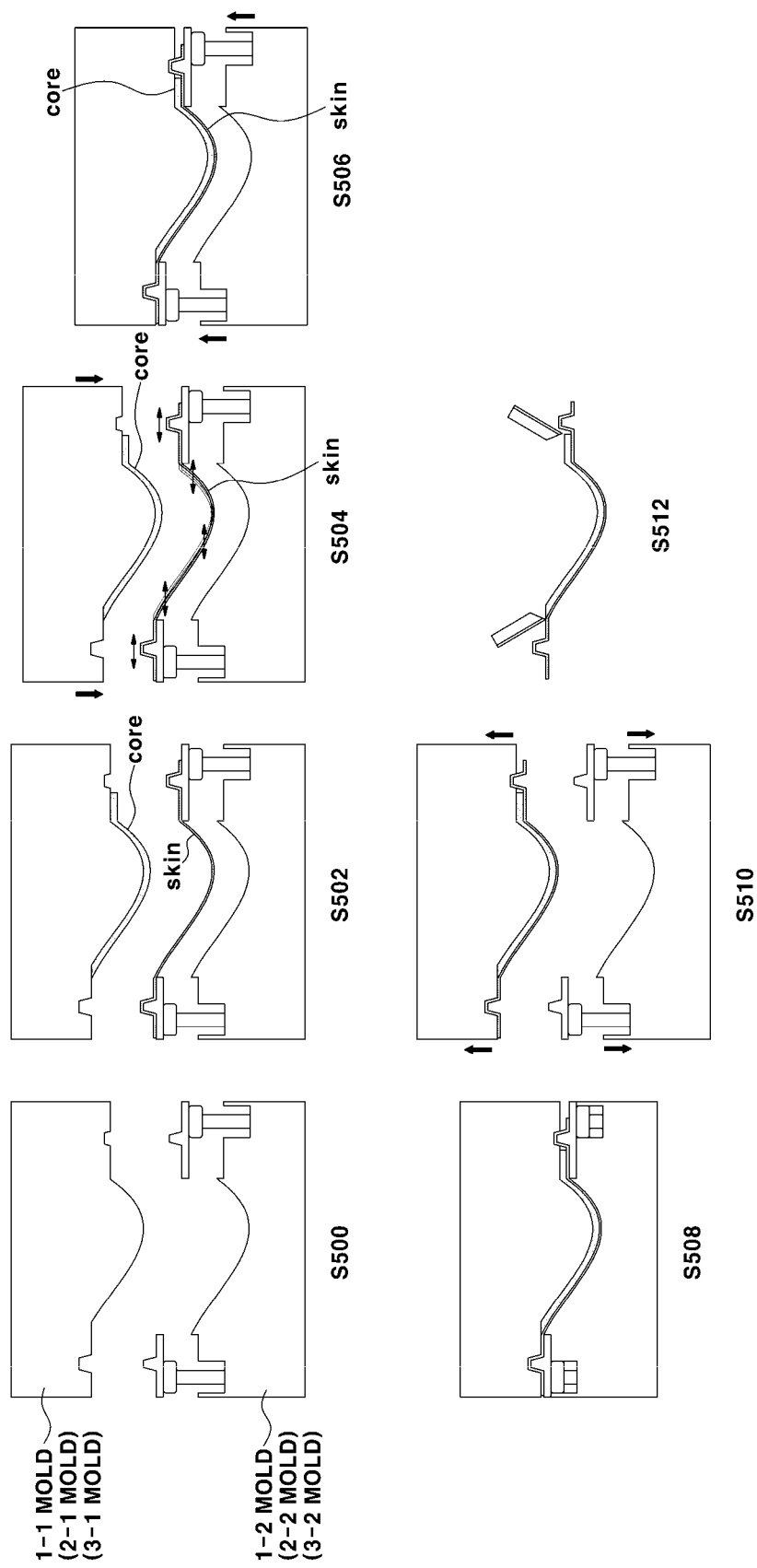
FIG. 5 shows a pressing process of pressing a core and the skin according to the exemplary embodiment of the present disclosure.

FIG. 5 shows a process of molding the interior material for the vehicle using the molding mold according to the exemplary embodiment of the present disclosure. Hereinafter, the interior material for the vehicle will be descried in detail using the molding mold with reference to FIG. 5.

In step S500, a supporter is raised from the 1-2 mold, and at the same time, the 1-1 mold and the 1-2 mold are spaced apart from each other at a certain distance. As shown in FIG. 5, the supporter is located between the 1-1 mold and the 1-2 mold.

The 1-1 mold is set to have the mold temperature of 60° to 90°, and the 1-2 mold is set to have the mold temperature of 40° to less than 60° lower than the mold temperature of the 1-1 mold. In other words, this will be described later.

In step S502, the core is supported by the 1-1 mold, and the skin is supported by the supporter. According to the present disclosure, the 1-1 mold can have the core in close contact with the upper mold using a vacuum adsorption method, or have the core in close contact with the upper mold using a clamp. An adhesive including a hot melt or a bond is sprayed on a bottom surface of the core in a spray form for the bonding with the skin.

For the skin supported by the supporter, all portions of the skin are not supported but only the peripheral portion that is the rim of the skin is supported by the supporter. As described above, only the rim portion of the skin can be supported by the supporter, thereby increasing the degree of freedom of the skin.

In step S504, vibration is applied to the supporter. According to the present disclosure, the supporter can be horizontally vibrated, or the vibration can be vertically applied to the supporter. Of course, the supporter is preferably vibrated vertically. When the vibration is applied to the supporter, the skin supported by the supporter is also vibrated. When the skin is vibrated, the skin has the relatively high degree of freedom compared to the case of being fixed.

In step S506, the 1-1 mold moves towards the 1-2 mold, and therefore, the core in close contact with the 1-1 mold and the skin supported by the supporter are in close contact with each other. When the core and the skin are in close contact with each other, the vibration of the supporter is interrupted.

In S506 step, the 1-1 mold and the supporter further move towards the 1-2 mold. In other words, the 1-1 mold and the supporter move toward the 1-2 mold in the state where the core and the skin are in close contact with each other. The 1-1 mold moves toward the 1-2 mold to close the molding mold, and therefore, the core and the skin are molded in the 1-1 mold and the 1-2 mold.

Alternatively, in step S506, the 1-2 mold is configured to rise to a location adjacent to the 1-1 mold. Alternatively, each of the 1-1 mold and the 1-2 mold is configured to move towards each other.

Thereafter, in S508 step, the 1-1 mold and the 1-2 mold maintain the state of being moved to the location adjacent to each other to press the skin and the core.

As described above, the reason why the temperature of the 1-1 mold is set relatively higher than the temperature of the 1-2 mold is to easily press the skin and the core by an adhesive upon pressing.

In other words, the reason why the temperature of the mold at the core side is set higher is that a heat transfer is faster in the core than in the skin and the adhesive is applied to the core. It is possible to largely save the cost compared to applying the adhesive to the skin, and it is more efficient to reach up to an activation temperature of the adhesive due to the heat transferred to the core. In addition, the reason is that the basic physical property of the skin can be changed if a very high heat is transferred to the skin.

In step S510, the molding mold is opened by separating the 1-1 mold and the 1-2 mold from each other. For example, if the 1-1 mold moves upward, the supporter also moves upward and therefore, the interior material for the vehicle with the molding completed is exposed to the outside. More preferably, the 1-1 mold and the 1-2 mold can be vertically moved in a direction where they move away from each other, and the supporter can be located to have a predetermined distance between the 1-1 mold and the 1-2 mold.

Thereinafter, in step S512, a desired interior material for the vehicle is manufactured by separating the exposed interior material for the vehicle from the 1-1 mold and cutting an unnecessary portion.

Figure 6:
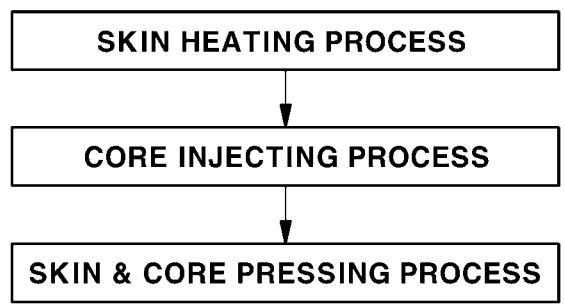
FIG. 6 shows a manufacturing process of manufacturing an interior material for a vehicle according to another exemplary embodiment of the present disclosure.

FIG. 6 shows a manufacturing process of manufacturing the interior material for the vehicle according to another exemplary embodiment of the present disclosure. Hereinafter, the manufacturing process of manufacturing the interior material for the vehicle according to another exemplary embodiment of the present disclosure will be described in detail with reference to FIG. 6.

Referring to FIG. 6, the manufacturing process of manufacturing the interior material for the vehicle is performed in the order of a skin heating process, a core injecting process, and a skin & core pressing process. Of course, other processes other than the aforementioned processes can be included in the manufacturing process of manufacturing the interior material for the vehicle.

The skin heating process is a process of preheating the skin to be pressed with the core. The skin proposed by the present disclosure is composed of three resin layers as described above.

The core injection process is a process of injecting the core to be pressed with the skin on which the stitch is formed.

The skin & core pressing process presses the skin and the core using the 2-1 mold and the 2-2 mold. In other words, the skin and the core are pressed by closing the 2-1 mold and the 2-2 mold in the state where the skin and the core are supported between the 2-1 mold and the 2-2 mold. Of course, the pressing process applies the adhesive to the core and then presses the core to the skin.

As described above, the 2-1 mold is set to have the mold temperature of 60° C. to 90° C., and the 2-2 mold is set to have the mold temperature of 40° C. to 60° C.

Figure 7:
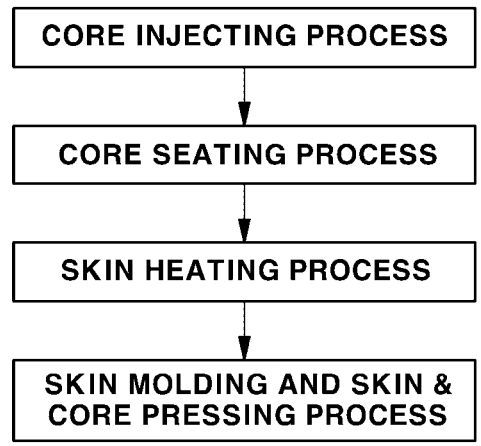
FIG. 7 shows a manufacturing process of manufacturing an interior material for a vehicle according to still another exemplary embodiment of the present disclosure.

FIG. 7 shows the manufacturing process of manufacturing the interior material for the vehicle according to still another exemplary embodiment of the present disclosure. Hereinafter, the manufacturing process of the manufacturing the interior material for the vehicle according to still another exemplary embodiment of the present disclosure will be described in detail with reference to FIG. 7.

Referring to FIG. 7, the manufacturing process of manufacturing the interior material for the vehicle is performed in the order of a core injection process, a core seating process, a skin heating process, and a skin molding and skin & core pressing process. Of course, other processes other than the aforementioned processes can be included in the manufacturing process of manufacturing the interior material for the vehicle.

The core injection process is a process of injecting the core to be pressed with the skin on which the stitch is formed.

The core seating process is a process of seating (supporting) the core on the mold.

The skin heating process is a process of preheating the skin to be pressed with the core. The skin proposed by the present disclosure is composed of three resin layers as described above.

The skin molding and skin & core pressing process is a process of pressing the skin and the core using a 3-1 mold and a 3-2 mold. In other words, the skin and the core are pressed by closing the 3-1 mold and the 3-2 mold in the state where the skin and the core are supported between the 3-1 mold and the 3-2 mold. Of course, the stitch is formed on the surface of the skin using the 3-2 mold with which the skin is in close contact.

As described above, the 3-1 mold is set to have the mold temperature of 60° C. to 90° C., and the 3-2 mold is set to have the mold temperature of 40° C. to 60° C.

While the present disclosure has been described with reference to the exemplary embodiments shown in the drawings, this is merely illustrative and it will be understood to those skilled in the art that various modifications and other exemplary embodiments equivalent thereto can be made therefrom.

What is claimed is:

1. A method for molding an interior material for a vehicle, the method comprising:
   heating a skin inserted between an upper surface heater and a lower surface heater spaced apart from each other;
   preforming the heated skin using an upper mold and a lower mold, wherein a temperature of the upper mold is set higher than a temperature of the lower mold; and
   pressing the preformed skin and a core using the upper mold and the lower mold,
   wherein the skin comprises: a first skin layer made of a thermosetting resin, a second skin layer bonded to a lower surface of the first skin layer and made of a thermoplastic resin, and a third skin layer bonded to a lower surface of the second skin layer and made of the thermoplastic resin.

2. The method of claim 1,
   wherein the heating of the skin comprises setting a temperature of the lower surface heater to be higher than a temperature of the upper surface heater.

3. The method of claim 2,
   wherein the pressing of the skin and the core comprises placing the core in close contact with the upper mold and the skin in close contact with the lower mold, and setting a temperature of the upper mold in close contact with the core to be relatively higher than a temperature of the lower mold in close contact with the skin.

4. A method for molding an interior material for a vehicle, the method comprising:
   heating a skin inserted between an upper surface heater and a lower surface heater spaced apart from each other; and
   pressing the heated skin and a core using an upper mold and a lower mold having set temperatures,
   wherein the skin comprises: a first skin layer made of a thermosetting resin, a second skin layer bonded to a lower surface of the first skin layer and made of a thermoplastic resin, and a third skin layer bonded to a lower surface of the second skin layer and made of the thermoplastic resin.

5. The method of claim 4,
wherein the heating of the skin comprises setting a temperature of the lower surface heater to be higher than a temperature of the upper surface heater, and
wherein the pressing of the skin and the core comprises setting the temperature of the upper mold to be relatively higher than the temperature of the lower mold.

* * * * *